United States Patent
Ji et al.

(10) Patent No.: US 11,250,532 B2
(45) Date of Patent: Feb. 15, 2022

(54) METHOD AND DEVICE FOR CHARGING VEHICLE PARKING, AS WELL AS SHOPPING CART AND SYSTEM

(71) Applicant: BOE TECHNOLOGY GROUP CO., LTD., Beijing (CN)

(72) Inventors: Shihao Ji, Beijing (CN); Xin Li, Beijing (CN); Hui Rao, Beijing (CN); Zhiguo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 230 days.

(21) Appl. No.: 16/480,972

(22) PCT Filed: Jan. 2, 2019

(86) PCT No.: PCT/CN2019/070078
§ 371 (c)(1),
(2) Date: Jul. 25, 2019

(87) PCT Pub. No.: WO2019/184540
PCT Pub. Date: Oct. 3, 2019

(65) Prior Publication Data
US 2020/0357090 A1    Nov. 12, 2020

(30) Foreign Application Priority Data

Mar. 30, 2018  (CN) .......................... 201810286622.3

(51) Int. Cl.
*G06Q 50/30*  (2012.01)
*G07B 15/06*  (2011.01)

(52) U.S. Cl.
CPC ............. *G06Q 50/30* (2013.01); *G07B 15/06* (2013.01)

(58) Field of Classification Search
CPC ............................................... G06Q 10/00–30
See application file for complete search history.

(56) References Cited

U.S. PATENT DOCUMENTS

2002/0121977 A1   9/2002  Wieth et al.
2002/0121978 A1   9/2002  Wieth et al.
(Continued)

FOREIGN PATENT DOCUMENTS

CN    1416558 A    5/2003
CN  101758842 A    6/2010
(Continued)

OTHER PUBLICATIONS

Sloane, Martin; "New technology puts brakes on thefts of shopping carts"; Published Jan. 11, 2011; South Coast Today; pp. 1-3 (Year: 2011).*

(Continued)

*Primary Examiner* — George Chen
*Assistant Examiner* — Michael C Moroney
(74) *Attorney, Agent, or Firm* — Myers Bigel, P.A.

(57) ABSTRACT

Embodiments of the present disclosure relate to a computer-implemented method. The method may include receiving identification information of a vehicle and identification information of a parking space to bind the vehicle with the parking space and generate binding information, receiving a time when the vehicle enters the parking space and a time when the vehicle exits the parking space, calculating a parking fee of the vehicle according to the time when the vehicle enters the parking space and the time when the vehicle exits the parking space, determining identification information of a shopping cart that corresponds to the vehicle according to the identification information of the vehicle, the binding information of the vehicle and the parking space, and a correspondence between the parking space and the shopping cart, and sending the parking fee of the vehicle to the shopping cart that corresponds to the identification information of the shopping cart.

16 Claims, 4 Drawing Sheets

(56) References Cited

U.S. PATENT DOCUMENTS

| | | | |
|---|---|---|---|
| 2003/0102969 A1* | 6/2003 | Parsons | B62B 3/1404 340/539.13 |
| 2004/0122688 A1* | 6/2004 | Janda | G06Q 30/04 705/34 |
| 2006/0103530 A1* | 5/2006 | Prather | G06Q 10/087 340/568.5 |
| 2006/0191858 A1* | 8/2006 | Posner | A47F 10/04 211/20 |
| 2008/0230603 A1* | 9/2008 | Stawar | B62B 3/1408 235/383 |
| 2010/0198626 A1* | 8/2010 | Cho | G06Q 30/0267 705/5 |
| 2012/0123826 A1* | 5/2012 | French | G06Q 30/00 705/14.1 |
| 2013/0265426 A1* | 10/2013 | Fan | G07B 15/02 348/148 |
| 2014/0157842 A1* | 6/2014 | Almomani | E05B 47/0001 70/277 |
| 2014/0214499 A1* | 7/2014 | Hudson | G07F 17/246 705/13 |
| 2015/0347738 A1* | 12/2015 | Ulrich | G06F 21/35 726/17 |
| 2016/0314514 A1 | 10/2016 | High et al. | |
| 2018/0096263 A1* | 4/2018 | Modi | G06Q 10/02 |

FOREIGN PATENT DOCUMENTS

| | | |
|---|---|---|
| CN | 203376876 U | 1/2014 |
| CN | 104464288 A | 3/2015 |
| CN | 105957157 A | 9/2016 |
| CN | 106204240 A | 12/2016 |
| CN | 107240294 A | 10/2017 |
| CN | 107526845 A | 12/2017 |
| CN | 107590587 A | 1/2018 |
| CN | 107680176 A | 2/2018 |
| CN | 107844895 A | 3/2018 |
| EP | 2381409 A2 | 10/2011 |
| JP | 10-238149 A | 9/1998 |
| WO | 2013111131 A1 | 8/2013 |
| WO | 2014072971 A1 | 5/2014 |

OTHER PUBLICATIONS

First Office Action and English language translation, CN Application No. 201810286622.3, dated Mar. 16, 2020, 22 pp.
Extended European Search Report corresponding to EP 19742117.5; dated Nov. 26, 2021 (8 pages).

\* cited by examiner

METHOD AND DEVICE FOR CHARGING VEHICLE PARKING, AS WELL AS SHOPPING CART AND SYSTEM

CROSS REFERENCE TO RELATED APPLICATIONS

The present application is the U.S. national phase entry of PCT/CN2019/070078, with an international filling date of Jan. 2, 2019, which claims the benefit of Chinese Patent Application No. 201810286622.3, filed on Mar. 30, 2018, the entire disclosures of which are incorporated herein by reference.

TECHNICAL FIELD

The present disclosure relates to a technical field of intelligent retail, and more particularly to a method and device for charging vehicle parking, a shopping cart and a system.

BACKGROUND

At present, for easy management of shopping carts, shopping carts are generally not allowed to enter into parking lots in most shopping malls. Thus, after users pay all the shopping items, they need to manually bring the items to their vehicles, which greatly increases the shopping burden on them.

Although shopping carts are allowed to enter into parking lots in a few shopping malls, only a few shopping cart return areas are set therein. Therefore, after users bring the purchased products to their vehicles, shopping carts are often littered haphazardly for the sake of convenience, which leads to great management costs and safety hazards to these shopping malls.

Current systems for charging vehicle parking generally capture vehicle parking time through a camera installed at the entrance and exit of a parking lot, and set a toll station at the exit of the parking lot to collect the parking fee. During peak shopping hours, vehicles often line up at the exit of the parking lot due to being charged for vehicle parking. This greatly damages users' shopping experience.

SUMMARY

The present disclosure is aimed to solve at least one of the above problems.

According to one aspect of the present disclosure, there is provided a computer-implemented method. The method may comprise: receiving identification information of a vehicle and identification information of a parking space to bind the vehicle with the parking space and generate respective binding information; receiving a time when the vehicle enters the parking space and a time when the vehicle exits the parking space; calculating a parking fee of the vehicle according to the time when the vehicle enters the parking space and the time when the vehicle exits the parking space; determining identification information of a shopping cart that corresponds to the vehicle according to the identification information of the vehicle, the binding information of the vehicle and the parking space, and a correspondence between the parking space and the shopping cart; and sending the parking fee of the vehicle to the shopping cart that corresponds to the identification information of the shopping cart.

In an embodiment, the method may further comprise: sending an unlocking command to a lock device at the parking space to unlock the shopping cart when the vehicle enters the parking space; and sending a locking command to the lock device at the parking space to lock the shopping cart when the vehicle exits the parking space. In an embodiment, the method may further comprise: recording an unlock time when the unlocking command is sent; and in response to a detection that the shopping cart stays at the parking space after a first pre-determined time period elapsed from the unlock time, sending the locking command to the lock device at the parking space to lock the shopping cart.

In an embodiment, the method may further comprise: sending an unlocking command to a lock device at the parking space to unlock the shopping cart when the vehicle enters the parking space; and sending a locking command to the lock device at the parking space to lock the shopping cart when the shopping cart is detected at the parking space and after a notification of successful payment of the parking fee of the vehicle is received.

In an embodiment, the method may further comprise: determining whether the shopping cart is returned correctly; in response to a determination that the shopping cart is returned correctly, subtracting a first pre-determined fee from a calculated parking fee to derive the parking fee of the vehicle; and/or in response to a determination that the shopping cart is not returned correctly, adding a second pre-determined fee to the calculated parking fee to derive the parking fee of the vehicle, and/or sending prompt information.

In an embodiment, determining whether the shopping cart is returned correctly may comprise: receiving the identification information of the shopping cart; and determining whether the identification information of the shopping cart matches with the identification information of the parking space.

In an embodiment, the method may further comprise: recording a payment time when the parking fee of the vehicle is successfully paid; receiving a departure time when the vehicle exits a parking lot; comparing a difference between the departure time and the payment time with a second pre-determined time period; and if the difference between the departure time and the payment time is greater than or equal to the second pre-determined time period, calculating a parking fee of the vehicle for a duration between the departure time and the payment time.

According to another aspect of the present disclosure, there is provided a computing device. The computing device may comprise: a first receiver configured to receive identification information of a vehicle and identification information of a parking space to bind the vehicle with the parking space; a second receiver configured to receive a time when the vehicle enters the parking space and a time when the vehicle exits the parking space; a first calculator configured to calculate a parking fee of the vehicle according to the time when the vehicle enters the parking space and the time when the vehicle exits the parking space; a first determiner configured to determine identification information of a shopping cart that corresponds to the vehicle according to the identification information of the vehicle, a binding relationship of the vehicle and the parking space, and a correspondence between the parking space and the shopping cart; and a first sender configured to send the parking fee of the vehicle to the shopping cart that corresponds to the identification information of the shopping cart.

In an embodiment, the computing device may further comprise: a second sender configured to send an unlocking command to a lock device at the parking space to unlock the shopping cart when the vehicle enters the parking space; and a third sender configured to send a locking command to the lock device at the parking space to lock the shopping cart when the vehicle exits the parking space. In an embodiment, the computing device may further comprise: a first recorder configured to record an unlock time when the unlocking command is sent; and a detector configured to, in response to a detection that the shopping cart stays at the parking space after a first pre-determined time period elapsed from the unlock time, send the locking command to the lock device at the parking space to lock the shopping cart.

In an embodiment, the computing device may further comprise: a second sender configured to send an unlocking command to a lock device at the parking space to unlock the shopping cart when the vehicle enters the parking space; and a third sender configured to send a locking command to the lock device at the parking space to lock the shopping cart when the shopping cart is detected at the parking space and after a notification of successful payment of the parking fee of the vehicle is received.

In an embodiment, the computing device may further comprise: a second determiner configured to determine whether the shopping cart is returned correctly; in response to a determination that the shopping cart is returned correctly, subtract a first pre-determined fee from a calculated parking fee to derive the parking fee of the vehicle; and/or in response to a determination that the shopping cart is not returned correctly, add a second pre-determined fee to the calculated parking fee to derive the parking fee of the vehicle, and/or send prompt information.

In an embodiment, determining whether the shopping cart is returned correctly may comprise: receiving the identification information of the shopping cart; and determining whether the identification information of the shopping cart matches with the identification information of the parking space.

In an embodiment, the computing device may further comprise: a second recorder configured to record a payment time when the parking fee of the vehicle is successfully paid; a third receiver configured to receive a departure time when the vehicle exits a parking lot; a comparator configured to compare the difference between the departure time and the payment time with a second pre-determined time period; and a second calculator configured to, if the difference between the departure time and the payment time is greater than or equal to the second pre-determined time period, calculate a parking fee of the vehicle for duration between the departure time and the payment time.

According to a further aspect of the present disclosure, there is provided a shopping cart. The shopping cart may comprise: a cart body; an identifier configured to identify the shopping cart; a communicator configured to receive a parking fee of a vehicle; and an output device configured to output the parking fee for user's payment of the parking fee.

In an embodiment, the shopping cart may further comprise: a lock device counterpart configured to lock the shopping cart.

In an embodiment, the lock device counterpart comprises an electromagnetic lock attachment.

In an embodiment, the identifier comprises one of an electronic tag, a QR code or a bar code.

In an embodiment, the shopping cart may further comprise: a navigation system configured to navigate via a positioning beacon.

In an embodiment, the shopping cart may further comprise: an input device configured to input a user command.

In an embodiment, the output device is also configured to output at least one of the following: text information, voice information or optical information. In an embodiment, the output device is further configured to output information about whether the shopping cart is returned correctly.

According to a yet aspect of the present disclosure, there is provided a system for charging vehicle parking. The system for charging vehicle parking may comprise: a plurality of shopping carts as stated above that correspond to a plurality of parking spaces in a one-to-one relationship; a computing device as stated above; and a plurality of image capturing apparatuses respectively distributed at the plurality of parking spaces, with each image capturing apparatus being configured to store identification information of its corresponding parking space, capture identification information of a vehicle at its corresponding parking space, record a time when the vehicle enters the parking space and a time when the vehicle exits the parking space, and send, to the computing device, the identification information of the parking space, and the identification information of the vehicle, the time when the vehicle enters the parking space and the time when the vehicle exits the parking space.

In an embodiment, the system for charging vehicle parking may further comprise: a plurality of lock devices respectively distributed at the plurality of parking spaces, with each lock device being configured to lock the shopping cart at its corresponding parking space.

In an embodiment, the lock device comprises an electromagnetic lock.

In an embodiment, each of the image capturing apparatuses is further configured to capture identification information of the shopping chart; or the system for charging vehicle parking further comprises a plurality of electronic tag readers or scanners disposed at the plurality of parking spaces, with each electronic tag reader or scanner being configured to read identification information of the shopping cart at its corresponding parking space.

In an embodiment, each of the parking spaces comprises a space configured to place the corresponding shopping cart.

According to another aspect of the present disclosure, there is provided a computer-readable medium. The computer-readable medium has computer instructions stored thereon, and when executed by a processor, the computer instructions enable the processor to perform the above-mentioned method.

BRIEF DESCRIPTION OF DRAWINGS

For clearer explanation of the embodiments of the present disclosure, the embodiments of the present disclosure will be described in detail with reference to the drawings. The embodiments of the present disclosure are intended to explain the present disclosure, and should not be understood as limitations to the present disclosure. In the drawings.

Identical or similar reference numerals indicate identical or similar elements.

DETAILED DESCRIPTION

Figure 1:
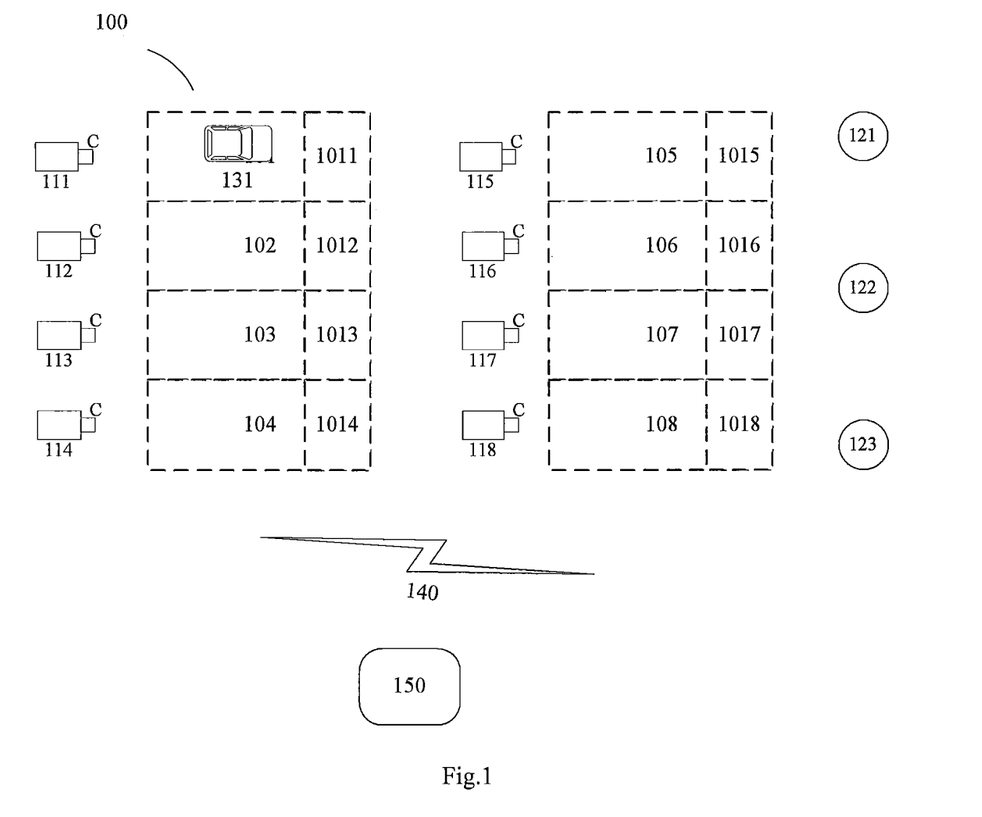
FIG. 1 shows a schematic view of a vehicle parking charging system according to an embodiment of the present disclosure.

FIG. 1 shows a schematic view of a vehicle parking charging system 100 according to an embodiment of the present disclosure. As shown in FIG. 1, the vehicle parking charging system 100 may comprise a plurality of parking spaces, such as parking spaces 102, 103, 104, 105, 106, 107, 108. Each of the parking spaces has unique identification information and is configured to be distinguishable from other parking spaces. The identification information according to the present disclosure may be a number, a picture, and the like.

According to the present disclosure, each of the parking spaces may comprise a space configured to place a corresponding shopping cart. For instance, as shown in FIG. 1, a space 1011 corresponding to a parking space for parking a vehicle 131, a space 1012 corresponding to a parking space 102, a space 1013 corresponding to a parking space 103, a space 1014 corresponding to a parking space 104, a space 1015 corresponding to a parking space 105, a space 1016 corresponding to a parking space 106, a space 1017 corresponding to a parking space 107, and a space 1018 corresponding to a parking space 108. According to the present disclosure, parking spaces correspond to shopping carts in a one-to-one relationship. Thus, it may be ensured that vehicles parked at particular parking spaces correspond to shopping carts placed at the particular parking spaces in a one-to-one relationship, thereby further ensuring that parking fees paid later through the shopping carts are associated with respective vehicles.

It should be noted that although the space in FIG. 1 is shown as empty, a shopping cart when not used by a user may be placed in the space corresponding thereto so that after parking, the user may directly take the shopping cart at the parking space corresponding to his vehicle. By arranging a space at each parking space for placing a shopping cart, the user may conveniently take a shopping cart before shopping and may bring purchased products from the shopping cart to the vehicle at the parking space after shopping, which saves users' energy and improves shopping experience.

According to the present disclosure, the vehicle parking charging system 100 may comprise a plurality of image capturing apparatuses, for example, as shown in FIG. 1, image capturing apparatuses 111, 112, 113, 114, 115, 116, 117 and 118. The image capturing apparatus according to the present disclosure may comprise a camera, a monitor, and any apparatus configured to capture an image.

The image capturing apparatus is arranged at each parking space. The image capturing apparatuses correspond to the parking spaces in a one-to-one relationship. In an embodiment, the image capturing apparatus may, for example, pre-store identification information of the corresponding parking space, so as to subsequently bind identification information of a captured vehicle with the identification information of the parking space. For instance, as shown in FIG. 1, the image capturing apparatus 112 corresponds to the parking space 102, and stores the identification information of the parking space 102; the image capturing apparatus 113 corresponds to the parking space 103, and stores the identification information of the parking space 103; the image capturing apparatus 114 corresponds to the parking space 104, and stores the identification information of the parking space 104, and the like. In addition, the image capturing apparatus may also capture identification information of the vehicle, record a time when the vehicle enters the parking space and a time when the vehicle exits the parking space, and send, to e.g., a computing device 150 as shown in FIG. 1, the time when the vehicle enters the parking space and the time when the vehicle exits the parking space. For instance, as shown in FIG. 1, when the image capturing apparatus 111 detects that a vehicle 131 completely enters the parking space, it may capture the identification information of the vehicle 131 and records the time when the vehicle 131 enters the corresponding parking space. At this time, the image capturing apparatus 111 may also send, to the computing device 150, the identification information of the captured vehicle 131 and the identification information of the corresponding parking space, so that the computing device 150 binds the vehicle 131 with the corresponding parking space. When the image capturing apparatus 111 detects that the vehicle completely exits the parking space, it may record the time when the vehicle 131 exits the corresponding parking space, and send, to the computing device 150, the previously-recorded time when the vehicle 141 enters the parking space and the now-recorded time when the vehicle 131 exits the parking space. In an embodiment, the image capturing apparatus 111 may send, to the computing device 150, the time when the vehicle 131 enters the parking space upon detecting the vehicle 131 has fully entered the parking space.

Figure 2A:
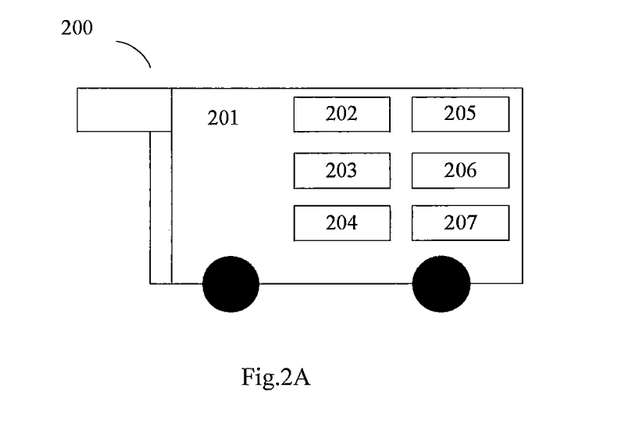
FIG. 2A shows a structural schematic view of a shopping cart according to an embodiment of the present disclosure.

The vehicle parking charging system 100 may further comprise a plurality of shopping carts (not shown in FIG. 1), which, when not used by a user, may be respectively placed at the spaces (e.g., 1012, 1013, 1014, 1015, 1016, 1017, 1018) of the parking spaces shown in FIG. 1. The shopping carts correspond to the spaces in a one-to-one relationship. The shopping cart according to the present disclosure may be the one shown in FIG. 2. The shopping cart according to the present disclosure will be explained later with reference to FIG. 2.

As shown in FIG. 1, the vehicle parking charging system 100 may comprise a computing device 150 configured to charge parking fees and manage shopping carts, etc. The computing device 150 may comprise a server, a computer, a mobile phone, a PDA and the like. The computing device 150 may be, for example, the computing device 300 shown in FIG. 3 and the computing device 500 shown in FIG. 5 that will be described later.

The vehicle parking charging system 100 may further comprise a network 140 configured to transmit information between various apparatuses/devices of the vehicle parking charging system 100. For instance, the network 140 may be configured to transmit information sent by the image capturing apparatuses 111, 112, 113, 114, 115, 116, 117 and 118 to the computing device 150, and transmit instructions and information of the computing device 150 to the shopping cart. The network may be a wired network (such as a LAN or Internet), a wireless network (such as WIFI or Bluetooth), or a combination thereof.

It should be noted that although FIG. 1 only shows a certain number of parking spaces, spaces configured to accommodate a shopping cart, image capturing apparatuses and beacons, those skilled in the art will appreciate that the vehicle parking charging system according to the present disclosure may comprise any number of parking spaces, spaces configured to accommodate a shopping cart, image capturing apparatuses, beacons.

FIG. 2A shows a structural schematic view of a shopping cart 200 according to an embodiment of the present disclosure. As shown in FIG. 2A, the shopping cart 200 may comprise a cart body 201. The cart body 201 may, for example, comprise wheels, a basket and the like, and may be any common cart body.

Figure 2B:
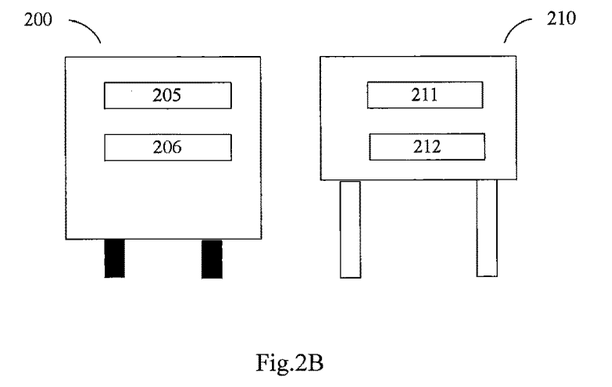
FIG. 2B shows a schematic view of a lock device counterpart and a corresponding lock device according to an embodiment of the present disclosure.

As shown in FIG. 2A, the shopping cart 200 may comprise an identifier 205 configured to identify the shopping cart so as to make it distinguishable from other shopping carts. The identifier 205 may comprise an electronic tag, a QR code or a barcode. Under such circumstances, according to the present disclosure, the vehicle parking charging system 100 may comprise a plurality of apparatuses corresponding to the identifiers of the shopping carts and configured to read the identification information of the shopping carts, and which may be respectively distributed at, for example, a plurality of parking spaces (e.g., 1011, 1012, 1013, 1014, 1015, 1016, 1017 and 1018) as shown in FIG. 1, and may comprise respective electronic tag readers (in the case where the identifier 205 is an electronic tag) or scanners (in the case where the identifier 205 is a barcode). In the case where the identifier 205 is a QR code, the image capturing apparatus (e.g., 111, 112, 113, 114, 115, 116, 117 and 118) as shown in FIG. 1 may also be configured to capture the identification information of the shopping cart. As such, there is no need to arrange an additional apparatus configured to read the identification information of the shopping cart. In actual application, there is provided, at each parking space, an apparatus configured to read the identification information of the shopping cart, such as an electronic tag reader, a scanner, or an image capturing apparatus. When disposing the apparatus, it is required to ensure that the identification information of the shopping cart can be read. For instance, as shown in FIG. 2B, the identifier 205, such as an electronic tag, of the shopping cart, and an apparatus 211 that is configured to read identification information, such as an electronic tag reader, are located at the same height and face to face.

As shown in FIG. 2A, the shopping cart 200 may comprise a communicator 207 configured to receive the parking fee of a vehicle. In an embodiment, the communicator 207 may be configured to receive from e.g., a computing device 150 as shown in FIG. 1 the parking fee of a vehicle that corresponds to the shopping cart in which the communicator 207 is comprised. In another embodiment, the communicator 207 may be configured to receive any other information, such as command information or prompt information, from e.g., the computing device 150, and may also be configured to send any information, such as a user command, to the computing device 150. The communicator 207 may be, e.g., an integrated circuit assembly or wireless communication terminal supporting such communication protocols as Bluetooth and WIFI.

As shown in FIG. 2A, the shopping cart 200 may comprise an output device 202, which is configured to output the parking fee of a vehicle so that a user may pay the parking fee of the vehicle. For instance, after receiving the parking fee of a corresponding vehicle from the computing device 150, the shopping cart 200 may present the parking fee of the vehicle in a visible manner (such as, a QR code) to the user. Then, the user may pay the parking fee with e.g., such terminals as a cell phone by a way of e.g., code scanning using the cell phone. After successful payment, the mobile terminal of the user may, e.g., notify the computing device 150 of "successful payment". The shopping cart according to the present disclosure may be configured to pay the parking fee. Thus, users do not have to gather at the exit of a parking lot for payment, thereby solving the problem of vehicle lining up at the exit of the parking lot.

In an embodiment, the output device 202 may also be configured to output at least one of the following: text information, voice information or optical information. For instance, when the shopping cart 200 receives a notification that it has been unlocked, the output device 202 may output voice prompt information, such as a speech, to prompt the user that "the shopping cart is usable". In another example, when the user successfully pays the parking fee, the output device 202 may output voice prompt information, such as a speech, or optical prompt information, such as flashing, or text prompt information, such as a text, to prompt the user of "successful payment". In still another example, the output device 202 may also output navigation information so as to provide navigation to e.g., a parking lot for the user. In a further example, the output device 202 may output information of a vehicle corresponding to the shopping cart in which the output device is comprised. In an embodiment, the communicator 207 of the shopping cart may receive information about whether the shopping cart is returned correctly, and the output device 202 may output information about whether the shopping cart is returned correctly. According to the present disclosure, the output device 202 may output any information as required. The output device 202 of the shopping cart 200 may comprise a display screen, a touch screen, a speaker, a light, etc.

As shown in FIG. 2A, the shopping cart 200 may further comprise: an input device 204 configured to input a user command. In an embodiment, the input device 204 may comprise a button configured to allow a user to manually unlock the shopping cart when the shopping cart 200 is locked. The time period during which the button may be operated by a user may be pre-set. For instance, suppose a pre-set time period starting from the time when the shopping cart 200 receives an unlocking command is a time period during which the button may be operated by a user. During the time period, the user may manually operate the button to unlock the shopping cart. The user may not operate the button beyond the time period. Thus, it may prevent a shopping cart from being taken away by a user at other parking space in case it is not taken by its corresponding user in time, thereby avoiding miscalculation of the parking fee. In another embodiment, the input device 204 may comprise a touch screen, a keyboard, etc. The user may input query information through the touch screen or the keyboard so that the user may query vehicle information, parking lot information, shopping information, etc. It should be noted that the input device 204 according to the present disclosure may be any device configured to input information.

As shown in FIG. 2A, the shopping cart 200 may further comprise a lock device counterpart 206 configured to lock the shopping cart. The lock device counterpart 206 usually needs to match with a lock device in order to lock the shopping cart. According to the present disclosure, a lock device counterpart and a corresponding lock device are disposed at each parking space and configured to lock the shopping cart at the parking space.

The lock device counterpart 206 and the lock device may be integrated together, or arranged separately. In the case where the lock device counterpart 206 and the lock device are integrated in the shopping cart 200, the lock device counterpart 206 and the lock device may be e.g., an electronic lock. In such a case, the wheels of the shopping cart 200 may be braked when the electronic lock is in a locked state, and the shopping cart 200 may slide when the electronic lock is in an unlocked state. In another example, the lock device counterpart 206 and the lock device may also be a railing configured at the parking space to surround the shopping cart. In a locked state, the railing is lowered to block the shopping cart; and in an unlocked state, the railing is lifted so that the user may take the shopping cart away. In the case where the lock device counterpart 206 and the lock device are separately arranged, the lock device counterpart may comprise an electromagnetic lock attachment, and the lock device may comprise an electromagnetic lock. FIG. 2B shows a schematic view of an environment where a lock device counterpart and a corresponding lock device are located according to an embodiment of the present disclosure. As shown in FIG. 2B, the electromagnetic lock attachment 206 may be located on the shopping cart 200, and the corresponding electromagnetic lock 212 may be located on a baffle 210 and correspond to the electromagnetic lock attachment 206 (for example, located at the same height). In practical use, the baffle 210 is, for example, arranged at a space configured to place the shopping cart 200 in the parking space. In a locked state, the electromagnetic lock 212 attaches the electromagnetic lock attachment 206 so that the shopping cart is locked. In an unlocked state, the electromagnetic lock 212 releases the electromagnetic lock attachment 206 so that the shopping cart is released and may be taken away by a user. It should be noted that the lock device of the present disclosure may be any lock device configured to lock the shopping cart. The lock device and corresponding lock device counterpart according to the present disclosure may be operated wirelessly (e.g., by receiving a lock or unlocking command from the computing device 150) or manually (e.g., by pressing the button on the shopping cart by the user) so as to lock and unlock the shopping cart and prevent a shopping cart at a particular parking space from being taken away by a user at other parking space, which may cause the miscalculation of parking fees.

As shown in FIG. 2A, the shopping cart 200 may further comprise a navigation system 203 configured to navigate via a positioning beacon. The positioning beacon is e.g., a beacon that is well-known in the art and installed at various locations in a parking lot, such as beacons 121, 122, 123 as shown in FIG. 1. The navigation system 203 may provide a user with navigation to e.g., the parking lot by detecting the positioning beacon, and may be various known navigation systems.

Figure 3:
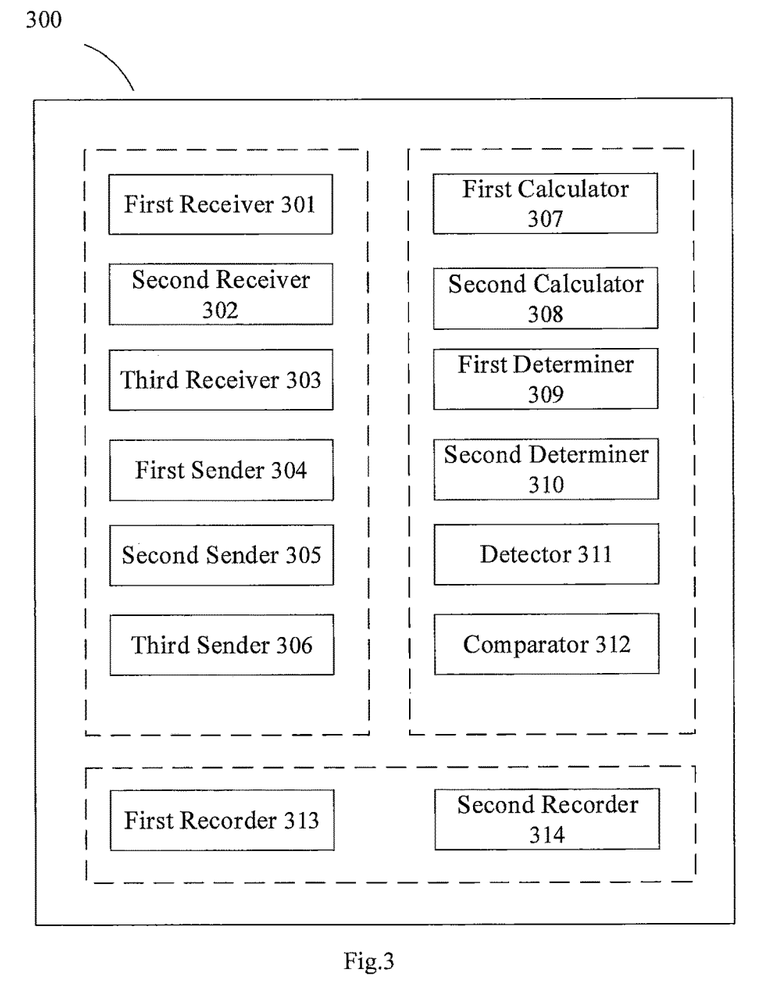
FIG. 3 shows a functional block diagram of a computing device according to an embodiment of the present disclosure.

FIG. 3 shows a functional block diagram of a computing device 300 according to an embodiment of the present disclosure. As shown in FIG. 3, the computing device 300 may comprise a first receiver 301 configured to receive identification information of a vehicle and identification information of a parking space to bind the vehicle with the parking space and generate respective binding information. When the vehicle is driven into a parking lot and enters a particular parking space, an image capturing apparatus located at the particular parking space captures the identification information of the vehicle. Further, the image capturing apparatus will send the identification information of the vehicle and the identification information of the parking space corresponding to the image capturing apparatus to the computing device 300, so that the computing device 300 binds the vehicle to the parking space. In an embodiment, the identification information of the parking space may be replaced by an identification number of the image capturing apparatus. The computing device 300 may obtain the identification number of the parking space on the basis of the identification number of the image capturing apparatus and a pre-stored correspondence between the image capturing apparatus and the parking space, thereby binding the vehicle with the parking space.

The computing device 300 may comprise a second receiver 302 configured to receive a time when the vehicle enters the parking space and a time when the vehicle exits the parking space. In an embodiment, when the vehicle enters the parking space, the image capturing apparatus will record the time when the vehicle enters the parking space and send the time to the second receiver 302. When the vehicle exits the parking space, the image capturing apparatus will again record the time when the vehicle exits the parking space and send the time to the second receiver 302. The second receiver 302 will receive the time when the vehicle enters the parking space and the time when the vehicle exits the parking space in real time so as to calculate a parking fee. It should be noted that while receiving the time when the vehicle exits the parking space, the second receiver 302 may also receive the identification information of the vehicle simultaneously so as to query a time when the vehicle enters the parking space by means of the identification information of the vehicle, thereby calculating the parking fee for the vehicle.

The computing device 300 may comprise a first calculator 307 configured to calculate the parking fee for the vehicle according to the time when the vehicle enters the parking space and the time when the vehicle exits the parking space. In an embodiment, the parking fee of the vehicle may only involve a time period between the time when the vehicle enters the parking space and the time when the vehicle exits the parking space. In another embodiment, the parking fee of the vehicle may involve a time period between the time when the vehicle enters the entrance of the parking lot and the time when the vehicle exits the parking space. According to the present disclosure, the time period to which the parking fee of the vehicle is related may be set as required.

The computing device 300 may comprise a first determiner 309 configured to determine identification information of a shopping cart that corresponds to the vehicle according to the identification information of the vehicle, the binding information of the vehicle and the parking space, and a correspondence between the parking space and the shopping cart. In an embodiment, the computing device 300 pre-stores the correspondence between the parking space and the shopping cart, so as to determine the identification information of the parking space bound with the vehicle on the basis of the received identification information of the vehicle and the pre-determined binding relationship of the vehicle and the parking space, and then determine the identification information of the shopping cart that corresponds to the parking space (namely, vehicle).

As shown in FIG. 3, the computing device 300 may comprise a first sender 304 configured to send the parking fee of the vehicle to the shopping cart that corresponds to the identification information of the shopping cart as determined by the first determiner 309 (namely, the shopping cart that corresponds to the parking space where the vehicle is parked). According to the present disclosure, since vehicles correspond to parking spaces in a one-to-one relationship and parking spaces correspond to shopping carts in a one-to-one relationship, it may be ensured that the parking fee sent to the shopping cart used by the user is the parking fee of the vehicle driven by the user. Thus, the user may pay the parking fee next to the shopping cart he/she used, rather than at the exit of the parking lot, which avoids queues at the exit of the parking lot.

In an embodiment, as shown in FIG. 3, the computing device 300 may further comprise: a second sender 305 configured to send an unlocking command to a lock device at the parking space to unlock the shopping cart when the vehicle enters the parking space. The computing device 300 may further comprise: a third sender 306 configured to send a locking command to the lock device at the parking space to lock the shopping cart when the vehicle exits the parking space. As stated above, the shopping cart according to the present disclosure is usually locked at a corresponding parking space when not in use. Therefore, by unlocking a corresponding shopping cart after the vehicle enters a particular parking space and locking the shopping cart after the vehicle exits the parking space, it may be ensured that the shopping cart at the particular parking space would not be taken away by a user of other parking space, thereby preventing miscalculation of the parking fee and facilitating efficient management of shopping carts. In an embodiment, before the third sender 306 sends the locking command, the computing device 300 may determine whether the shopping cart is returned correctly as stated below. The locking command is sent to lock the shopping cart only when the shopping cart is returned correctly. Otherwise, the locking command will not be sent. This will make users and attendants correctly return the shopping carts that have not been returned correctly to corresponding parking spaces for later use.

In an embodiment, the computing device 300 may further comprise: a first recorder 313 configured to record the unlock time when an unlocking command is sent; and a detector 311 configured to, in response to a detection that the shopping cart still stays at the parking space after a first pre-determined time period elapsed from the unlock time, send a locking command to the lock device at the parking space to lock the shopping cart. In an embodiment, whether the shopping cart stays at the shopping space may be determined by whether the image capturing apparatus, or the electronic tag reader or scanner, captures the identification information of the shopping cart. If the image capturing apparatus, or the electronic tag reader or scanner can detect the identifier of the shopping cart, it may be determined that the shopping cart stays at the parking space; or otherwise, it may be determined that the shopping cart does not stay at the parking space. The detector 311 of the computing device 300 may determine whether the shopping cart stays at the parking space based on the detection information about the identifier of the shopping cart sent by the image capturing apparatus, or the electronic tag reader or scanner. According to the present disclosure, if the shopping cart is still detected at the parking space where the unlocking command is sent after the first predetermined time period elapsed from the unlock time, it indicates that the user probably does not use a shopping cart. Then, the computing device 300 timely sends the locking command to lock the shopping cart so as to prevent a user of other parking space from using the shopping cart, which may result in miscalculation of the parking fee.

In an embodiment, the computing device 300 may further comprise: a second determiner 310 configured to determine whether the shopping cart is returned correctly, and in response to a determination that the shopping cart is returned correctly, subtract a first pre-determined fee from the calculated parking fee to derive the parking fee of the vehicle; and/or in response to a determination that the shopping cart is not returned correctly, add a second pre-determined fee to the calculated parking fee to derive the parking fee of the vehicle, and/or send prompt information. When the computing device 300 receives information that the vehicle exits the parking space (comprising the time when the vehicle exits the parking space), whether the shopping cart is returned correctly may be further determined by using the image capturing apparatus, or the electronic tag reader or scanner. According to the present disclosure, correct return of a shopping cart may comprise two meanings: one is that the shopping cart is located at the parking space, and the other is that the shopping cart matches with the parking space. Thus, only when the image capturing apparatus, or the electronic tag reader or scanner returns the identification information of the shopping cart and the returned identification information of the shopping cart matches with the pre-stored identification information of the parking space, the second determiner 310 may determine that the shopping cart is returned correctly. If the image capturing apparatus, or the electronic tag reader or scanner does not return the identification information of the shopping cart or the returned identification information of the shopping cart does not match with the pre-stored identification information of the parking space, the second determiner 310 may determine that the shopping cart is not returned correctly. For users who correctly return the shopping carts, some parking fee may be subtracted from the normally calculated parking fee (such as the parking fee calculated according to the time when the vehicle enters the parking space and the time when the vehicle exits the parking space) as a reward. For users who do not return the shopping carts correctly, some parking fee may be added to the normally calculated parking fee as a punishment. In this way, the user may be motivated to actively place the shopping cart to a designated location, thereby solving the problem of random locating of shopping carts. In an embodiment, when the shopping cart is not returned correctly, prompt information (voice prompt information or optical prompt information) may be sent to the shopping cart to prompt the user or attendant. In this way, the user or the parking lot attendant may accurately return the shopping cart that has not been returned correctly to its corresponding parking space after getting the prompt information, thereby further efficiently managing the shopping carts. In an embodiment, the second determiner 310 may be configured to generate information about whether the shopping cart is returned correctly according to a determined result. The first sender 304 may be configured to send information about whether the shopping cart is returned correctly to the corresponding shopping cart.

In an embodiment, there may also be provided, at the exit of the parking lot, an image capturing apparatus configured to capture identification information of a vehicle and the time when the vehicle exits the parking lot so as to charge the vehicle which does not pay by means of a shopping cart. According to the present disclosure, if the user pays the parking fee next to the shopping cart with a mobile apparatus such as a cell phone, the mobile apparatus will timely send a notification of successful payment to the computing device 300. Thus, if the computing device 300 determines that the parking fee of the vehicle has been paid according to the notification of successful payment when the vehicle arrives at the exit of the parking lot, the vehicle may be allowed to leave. If the computing device 300 does not receive the notification of successful payment yet when the vehicle arrives at the exit of the parking lot, the computing device 300 may determine that the user of the vehicle does not pay the parking fee, and may calculate the parking fee according to the time when the vehicle enters the parking lot and the time when the vehicle exits the parking lot. In an embodiment, the second sender 305 may also be configured to send an unlocking command to a lock device at a parking space when the vehicle enters the parking space, so as to unlock the shopping cart. The third sender 306 may also be configured to send a locking command to the lock device at the parking space to lock the shopping cart when the shopping cart is detected at the parking space, after receiving the notification of successful payment of the parking fee of the vehicle.

In an embodiment, the computing device 300 may further comprise: a second recorder 314 configured to record the payment time when the parking fee of the vehicle is successfully paid; a third receiver 303 configured to receive the departure time when the vehicle exits a parking lot; a comparator 312 configured to compare the difference between the departure time and the payment time with a second pre-determined time period; and a second calculator 308 configured to, if the difference between the departure time and the payment time is greater than or equal to the second pre-determined time period, calculate the parking fee of the vehicle for a duration between the departure time and the payment time; or otherwise, the parking fee shall not be calculated for the duration. The second pre-determined time period may be set according to a reasonable time period required for driving the vehicle from the parking space to the exit of the parking lot. According to the present disclosure, by charging a vehicle which spends longer time than the second pre-determined time period to leave the parking lot after a user's successful payment via a shopping cart, it is possible to prevent vehicles from malicious stay, which facilitates management of the parking lot.

Components like the first, second and third receivers, the first, second and third senders, the first and second calculators, the first and second determiners, the detector, the comparator, and the first and second recorders etc. may include electronic circuitry or a combination of electronic circuitry and control programs that operate the components according to functions described herein.

Figure 4:
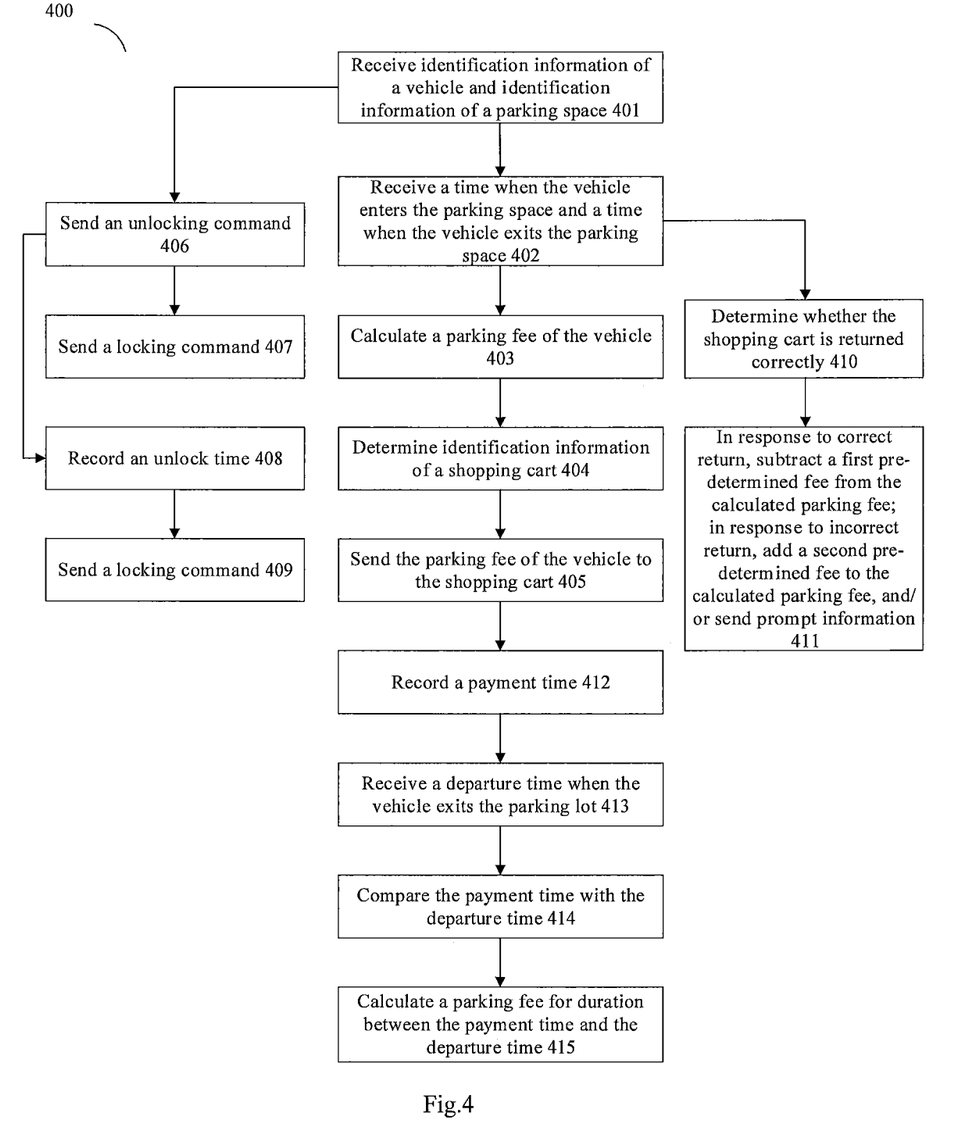
FIG. 4 shows a flowchart of a computer-implemented method according to an embodiment of the present disclosure.
Figure 5:
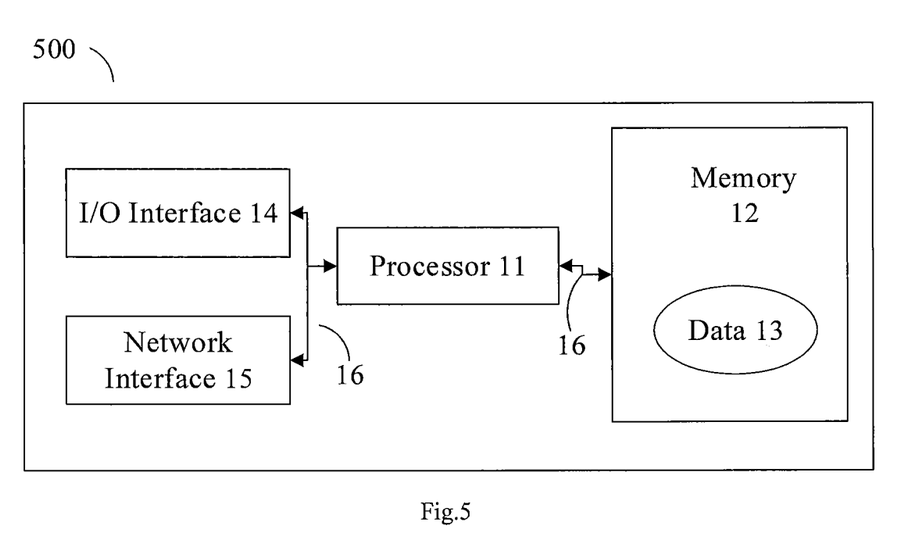
FIG. 5 shows a structural schematic view of a computing device according to an embodiment of the present disclosure.

FIG. 4 shows a flowchart of a computer-implemented method 400 according to an embodiment of the present disclosure. The method 400 may, for example, be implemented by the computing device 300 as shown in FIG. 3 and the computing device 500 as shown in FIG. 5. The method 400 is explained with reference to a particular vehicle and a particular parking space where the particular vehicle is parked.

As shown in FIG. 4, at the step 401, identification information of a vehicle and identification information of a parking space are received to bind the vehicle with the parking space and generate respective binding information.

At the step 402, a time when the vehicle enters the parking space and a time when the vehicle exits the parking space are received.

At the step 403, a parking fee of the vehicle is calculated according to the time when the vehicle enters the parking space and the time when the vehicle exits the parking space.

At the step 404, identification information of a shopping cart that corresponds to the vehicle is determined according to the identification information of the vehicle, the binding information of the vehicle and the parking space, and a correspondence between the parking space and the shopping cart.

At the step 405, the parking fee of the vehicle is sent to the shopping cart that corresponds to the identification information of the shopping cart.

In an embodiment, the method 400 may further comprise a step 406. At the step 406, when the vehicle enters the parking space, an unlocking command is sent to a lock device at the parking space to unlock the shopping cart that corresponds to the parking space. The method 400 may further comprise a step 407. At the step 407, when the vehicle exits the parking space, a locking command is sent to the lock device at the parking space to lock the shopping cart. In an embodiment, the step 407 may comprise the step of sending a locking command to the lock device at the parking space to lock the shopping cart when the shopping cart is detected at the parking space after receiving a notification of successful payment of the parking fee of the vehicle.

In an embodiment, the method 400 may further comprise a step 408. At the step 408, an unlock time when the unlocking command is sent is recorded. In addition, the method 400 may further comprise a step 409. At the step 409, in response to a detection that the shopping cart stays at the parking space after a first pre-determined time period elapsed from the unlock time, the locking command is sent to the lock device at the parking space to lock the shopping cart.

In an embodiment, the method 400 may further comprise steps 410 and 411. At the step 410, it is determined whether the shopping cart is returned correctly. In an embodiment, the step 410 may further comprise generating information about whether the shopping cart is returned correctly according to a determined result, and sending the information about whether the shopping cart is returned correctly to the corresponding shopping cart. At the step 411, in response to a determination that the shopping cart is returned correctly, a first pre-determined fee is subtracted from the calculated parking fee to derive the parking fee of the vehicle; and/or in response to the determination that the shopping cart is not returned correctly, a second pre-determined fee is added to the calculated parking fee to derive the parking fee of the vehicle, and/or prompt information is sent. In an embodiment, the step 410 of determining whether the shopping cart is returned correctly may comprise receiving identification information of a shopping cart; and determining whether the identification information of the shopping cart matches with identification information of the parking space. The shopping cart may be determined as being returned correctly only when it is determined based on a pre-stored correspondence between the shopping cart and the parking space that the identification information of the shopping cart matches with the identification information of the parking space.

In an embodiment, the method 400 may further comprise a step 412 of recording a payment time when the parking fee of the vehicle is successfully paid; a step 413 of receiving a departure time when the vehicle exits a parking lot; a step 414 of comparing the difference between the departure time and the payment time with a second pre-determined time period; and a step of 415 of, if the difference between the departure time and the payment time is greater than or equal to the second pre-determined time period, calculating the parking fee of the vehicle for a duration between the departure time and the payment time.

FIG. 5 shows a structural schematic view of a computing device 500 according to an embodiment of the present disclosure. With reference to FIG. 5, an exemplary system configured to implement various components of the described system and method may comprise a general-purpose computing device 500. The computing device 500 may be configured to implement all or a part of any component among the components in FIG. 3. The computing device 500 is only an example of a suitable computing device, and is not intended to provide any limitation to the use or functional scope of the currently disclosed subject matter.

Components of the computing device 500 may include, but are not limited to, a processor 11, a memory 12, and a system bus 16 that couples various system components comprising the memory to the processor 11. The system bus 16 may be any of several types of bus structures comprising a memory bus or memory controller, a peripheral bus, and a local bus using any of a variety of bus architectures. By way of example, and not limitation, such architectures comprise Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 500 may comprise a variety of computer-readable media. Computer-readable media may be any available media that may be accessed by the computing device 500 and comprises both volatile and nonvolatile media, and removable and non-removable media. By way of example, and not limitation, computer-readable media may comprise computer-readable storage media and communication media. Computer-readable storage media comprises volatile and nonvolatile, removable and non-removable media implemented in any method or technology configured to store information such as computer-readable instructions, data structures, program modules or other data. Computer-readable storage media comprises, but is not limited to, random access memory (RAM), read-only memory (ROM), electrically erasable programmable read-only memory (EEPROM), flash memory or other memory technology, CD-ROM, digital versatile disks (DVD) or other optical disk storage, magnetic cassettes, magnetic tape, magnetic disk storage devices or other magnetic storage devices, or any other medium which may be configured to store the desired information and which may accessed by the computing device 500. Communication media typically embodies computer-readable instructions, data structures, program modules or other data in a modulated data signal such as a carrier wave or other transport mechanism and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as RF, infrared and other wireless media. Combinations of the any of the above may also be comprised within the scope of computer-readable media.

The memory 12 may comprise computer storage media in the form of volatile and/or nonvolatile memory such as read only memory (ROM) and random access memory (RAM). A basic input/output system (BIOS), containing the basic routines that help to transfer information between elements within the computing device 500, such as during start-up, is typically stored in ROM. RAM typically contains data and/or program modules that are immediately accessible to and/or presently being operated on by processor 11. By way of example, and not limitation, data 13 that may be stored in the memory 12 as shown in FIG. 5 may comprise a BIOS, an operating system, application programs, and other program modules and program data.

The computing device 500 may also comprise other removable/non-removable, volatile/nonvolatile computer storage media.

Other removable/non-removable, volatile/nonvolatile computer storage media that may be used in the exemplary operating environment include, but are not limited to, magnetic tape cassettes, flash memory cards, DVDs, digital video tape, solid state RAM, solid state ROM, and the like.

The computer storage media as described above provide storage of computer-implementable instructions, data structures, program modules and other data for the computing device 500. When executed on the processor 11, the computer-implementable instructions enable the processor 11 to implement the methods and functions according to the embodiments of the present disclosure.

A user may enter commands and information into the computing device 500 through input devices such as a keyboard, and/or pointing device, commonly referred to as mouse, trackball or touch pad. Other input devices may comprise a microphone, a joystick, game pad, satellite dish, scanner, or the like. These and other input devices are often connected to the processor 11 through a user I/O interface 14 that is coupled to the system bus 16. A monitor or other type of display device may be connected to the system bus 16 via the user I/O interface 14, such as a video interface. In addition to the monitor, the computing device 500 may also be connected to other peripheral output devices such as speakers and printers, through the user I/O interface 14.

The computing device 500 may be connected to one or more remote computers through a network interface 15. The remote computer may be a personal computer, a server, a router, a network PC, a peer device or other common network node, and typically comprises many or all of the elements described above relative to the computing device 500.

The embodiment of the present disclosure also provides a computer-readable medium having computer instructions stored thereon. When executed on the processor, the computer instructions enable the processor to implement the methods and functions according to the embodiments of the present disclosure. The computer-readable medium may comprise any computer-readable medium as stated above.

The embodiment of the present disclosure also provides a computer program product. When executed, by the processor, instructions in the computer program product may realize the method according to the embodiment of the present disclosure.

In the description of the present specification, the description referring to the terms "one embodiment", "some embodiments", "an example", "a specific example", or "some examples" and the like means a particular feature, structure, material, or characteristic described in conjunction with the embodiment or example is comprised in at least one embodiment or example of the present disclosure. In the present specification, a schematic expression of the above terms is not necessarily directed to the same embodiment or example. Furthermore, the particular features, structures, materials, or characteristics described may be combined in any one or more embodiments or examples in suitable manner. Furthermore, in case of no confliction, those skilled in the art may combine and unite various embodiments or examples, as well as features thereof, described in the specification.

Moreover, the terms "first" and "second" are used for descriptive purposes only and shall not be construed as indicating or implying a relative importance or implicitly manifesting the number of technical features indicated. Thus, features defined by "first" or "second" may explicitly or implicitly comprise at least one of the features. In the description of the present disclosure, the meaning of "a plurality" is at least two, such as two or three, unless specifically defined otherwise.

Any process or method description in the flowcharts or otherwise described herein may be understood to represent a module, segment or portion of codes that comprises one or more executable instructions for implementing a customized logical function or process. And the scope of the preferred embodiments of the present disclosure comprises additional implementations, in which the functions may be performed in an order not shown or discussed herein (comprising in a substantially simultaneous manner or in an opposite order according to the functions involved). It will be understood by those skilled in the art to which the embodiments of the present disclosure pertain.

The logic and/or steps represented in the flowcharts or otherwise described herein, for example, may be considered as an ordered list of executable instructions for implementing logical functions, and may be embodied in any computer readable medium, for use in or in conjunction with an instruction execution system, device or apparatus (e.g., a computer-based system, a system comprising a processor, or other system that may obtain and execute instructions from the instruction execution system, device or apparatus). As far as the present specification is concerned, a "computer-readable medium" may be any device that may contain, store, communicate, propagate, or transport a program for use in or in conjunction with the instruction execution system, device or apparatus. More specific examples of the computer-readable medium may, e.g., comprise the following: electrical connections (electronic devices) having one or more wires, portable computer disk cartridges (magnetic devices), Random Access Memory (RAM), Read Only memory (ROM), Erasable Programmable Read Only Memory (EPROM) or flash memory, fiber optic devices, and Compact Disk Read Only Memory (CDROM). In addition, the computer-readable medium may even be paper or other suitable medium on which the program may be printed, because the program may be obtained in an electronic manner by, e.g., optically scanning and then editing, interpreting or, if necessary, processing the paper or other medium in other suitable manner, and then be stored in the computer memory.

It should be understood that various parts of the present disclosure may be implemented by hardware, software, firmware or a combination thereof. In the above-described embodiments, multiple steps or methods may be realized by software or firmware stored in a memory and executed by a suitable instruction execution system. For example, if realized by hardware, it may be implemented by any one or a combination of the following techniques well-known in the art: discrete logic circuits with logic gate circuits for implementing logic functions of data signals, application specific integrated circuits with suitable combinational logic gate circuits, programmable gate arrays (PGAs), field programmable gate arrays (FPGAs), etc.

Those ordinarily skilled in the art can understand that all or part of the methods according to the above embodiments may be completed by hardware in relation to program instructions, and the program may be stored in a computer-readable storage medium. When executed, the program comprises one or a combination of the steps for implementing the method embodiments.

In addition, various functional units in each embodiment of the present disclosure may be integrated into one processing module, or each unit may exist physically separately, or two or more units may be integrated into one module. The above integrated module may be implemented in the form of hardware or in the form of a software functional module. The integrated module, if implemented in the form of a software functional module and sold or used as an independent product, may also be stored in a computer-readable storage medium.

Although the embodiments of the present disclosure have been shown and described above, it can be understood that the above embodiments are exemplary and shall not be construed as limitations to the scope of the present disclosure. Those ordinarily skilled in the art may make variations, modifications and substitutions to the above embodiments within the scope of the present disclosure.

The invention claimed is:

1. A computer-implemented method, comprising:
receiving identification information of a vehicle and identification information of a parking space to bind the vehicle with the parking space and generate corresponding binding information;
receiving a time when the vehicle enters the parking space and a time when the vehicle exits the parking space;
calculating a parking fee of the vehicle according to the time when the vehicle enters the parking space and the time when the vehicle exits the parking space;
determining identification information of a shopping cart that corresponds to the vehicle according to the identification information of the vehicle, the binding information of the vehicle and the parking space, and a correspondence between the parking space and the shopping cart;
sending the parking fee of the vehicle to the shopping cart that corresponds to the identification information of the shopping cart;
sending an unlocking command to a lock device at the parking space to unlock the shopping cart when the vehicle enters the parking space; and
sending a locking command to the lock device at the parking space to lock the shopping cart when the shopping cart is detected at the parking space and after a notification of successful payment of the parking fee of the vehicle is received.

2. The method according to claim 1, further comprising:
recording an unlock time when the unlocking command is sent; and
sending the locking command to the lock device at the parking space to lock the shopping cart, in response to a detection that the shopping cart stays at the parking space after a first pre-determined time period elapsed from the unlock time.

3. The method according to claim 1, further comprising:
determining whether the shopping cart is returned correctly; and
subtracting a first pre-determined fee from a calculated parking fee to derive the parking fee of the vehicle in response to determining that the shopping cart is returned correctly; and/or
adding a second pre-determined fee to the calculated parking fee to derive the parking fee of the vehicle and/or sending prompt information in response to determining that the shopping cart is not returned correctly.

4. The method according to claim 3, wherein the determining whether the shopping cart is returned correctly comprises:
receiving the identification information of the shopping cart; and determining whether the identification information of the shopping cart matches with the identification information of the parking space.

5. The method according to claim 1, further comprising:
recording a payment time when the parking fee of the vehicle is successfully paid;
receiving a departure time when the vehicle exits a parking lot;
comparing a difference between the departure time and the payment time with a second pre-determined time period; and
calculating a parking fee of the vehicle for a duration between the departure time and the payment time when the difference between the departure time and the payment time is greater than or equal to the second pre-determined time period.

6. A computing device, comprising:
a first receiver circuitry configured to receive identification information of a vehicle and identification information of a parking space to bind the vehicle with the parking space and generate corresponding binding information;
a second receiver circuitry configured to receive a time when the vehicle enters the parking space and a time when the vehicle exits the parking space;
a first calculator circuitry configured to calculate a parking fee of the vehicle according to the time when the vehicle enters the parking space and the time when the vehicle exits the parking space;
a first determiner circuitry configured to determine identification information of a shopping cart that corresponds to the vehicle according to the identification information of the vehicle, the binding information of the vehicle and the parking space, and a correspondence between the parking space and the shopping cart;
a first sender circuitry configured to send the parking fee of the vehicle to the shopping cart that corresponds to the identification information of the shopping cart;
a second sender circuitry configured to send an unlocking command to a lock device at the parking space to unlock the shopping cart when the vehicle enters the parking space; and
a third sender circuitry configured to send a locking command to the lock device at the parking space to lock the shopping cart when the shopping cart is detected at the parking space and after a notification of successful payment of the parking fee of the vehicle is received.

7. The computing device according to claim 6, further comprising:
a first recorder circuitry configured to record an unlock time when the unlocking command is sent; and
a detector circuitry configured to send the locking command to the lock device at the parking space to lock the shopping cart in response to a detection that the shopping cart stays at the parking space after a first pre-determined time period elapsed from the unlock time.

8. The computing device according to claim 6, further comprising:
a second determiner circuitry configured to determine whether the shopping cart is returned correctly, subtract a first pre-determined fee from a calculated parking fee to derive the parking fee of the vehicle in response to a determination that the shopping cart is returned correctly and/or add a second pre-determined fee to the calculated parking fee to derive the parking fee of the vehicle, and/or send prompt information in response to determining that the shopping cart is not returned correctly.

9. The computing device according to claim 8, wherein the second determiner circuitry determines whether the shopping cart is returned correctly by performing operations comprising:
receiving the identification information of the shopping cart; and
determining whether the identification information of the shopping cart matches with the identification information of the parking space.

10. The computing device according to claim 6, further comprising:
a second recorder circuitry configured to record a payment time when the parking fee of the vehicle is successfully paid;
a third receiver circuitry configured to receive a departure time when the vehicle exits a parking lot;
a comparator circuitry configured to compare a difference between the departure time and the payment time with a second pre-determined time period; and
a second calculator circuitry configured to, when the difference between the departure time and the payment time is greater than or equal to the second pre-determined time period, calculate a parking fee of the vehicle for a duration between the departure time and the payment time.

11. A shopping cart, comprising:
a cart body;
an identifier circuitry configured to identify the shopping cart, the shopping cart corresponding to a parking space at which a cart space is arranged for the shopping cart;
a communicator circuitry configured to receive a parking fee of a vehicle, the parking fee being calculated according to a time when the vehicle enters the parking space and a time when the vehicle exits the parking space; and
an output device configured to output the parking fee for user's payment of the parking fee;
a lock device counterpart, matched with a lock device to receive an unlocking command to unlock the shopping cart when the vehicle enters the parking space; and to receive a locking command to lock the shopping cart when the shopping cart is located in the cart space and after a notification of successful payment of the parking fee of the vehicle is received.

12. The shopping cart according to claim 11, wherein the lock device counterpart and the lock device are integrated in the shopping cart.

13. The shopping cart according to claim 11, wherein the lock device counterpart and the lock device are arranged separately, and the lock device counterpart comprises an electromagnetic lock attachment, and the lock device comprises an electromagnetic lock.

14. A system for charging vehicle parking, comprising:
the computing device according to claim 6; and
an image capturing apparatus located at the parking space and being configured to store identification information of the parking space, capture identification information of the vehicle at the parking space, record a time when the vehicle enters the parking space and a time when the vehicle exits the parking space, and send, to the computing device, the identification information of the parking space, the identification information of the vehicle, the time when the vehicle enters the parking space and the time when the vehicle exits the parking space, wherein said system further comprises the shopping cart.

15. The system for charging vehicle parking according to claim 14,
wherein the image capturing apparatus is further configured to capture identification information of the shopping cart; or
wherein the system for charging vehicle parking further comprises an electronic tag reader or scanner disposed at the parking space, and being configured to read identification information of the shopping cart at the parking space.

16. A non-transitory computer-readable medium having computer instructions stored thereon, wherein when executed by a processor, the computer instructions cause the processor to implement the method according to claim 1.

* * * * *